United States Patent
Hill et al.

(10) Patent No.: US 11,834,160 B2
(45) Date of Patent: Dec. 5, 2023

(54) YAW REDUCTION SYSTEM AND METHOD FOR AIRCRAFT BRAKING

(71) Applicant: MEGGITT AIRCRAFT BRAKING SYSTEMS CORPORATION, Akron, OH (US)

(72) Inventors: James L. Hill, Massillon, OH (US); David N. Roe, Coventry Township, OH (US); Kurt Burkhalter, Akron, OH (US); Benjamin Robert Piercy Quickfall, Prescot (GB)

(73) Assignee: Meggitt Aircraft Braking Systems Corporation, Akron, OH (US)

( * ) Notice: Subject to any disclaimer, the term of this patent is extended or adjusted under 35 U.S.C. 154(b) by 0 days.

(21) Appl. No.: 17/786,976

(22) PCT Filed: Dec. 18, 2020

(86) PCT No.: PCT/US2020/065877
§ 371 (c)(1),
(2) Date: Jun. 17, 2022

(87) PCT Pub. No.: WO2021/127352
PCT Pub. Date: Jun. 24, 2021

(65) Prior Publication Data
US 2023/0094913 A1 Mar. 30, 2023

Related U.S. Application Data

(60) Provisional application No. 62/951,500, filed on Dec. 20, 2019.

(51) Int. Cl.
*B64C 25/48* (2006.01)
*B64C 25/42* (2006.01)
*B64C 25/46* (2006.01)

(52) U.S. Cl.
CPC ............ *B64C 25/48* (2013.01); *B64C 25/426* (2013.01); *B64C 25/46* (2013.01)

(58) Field of Classification Search
CPC ........ B64C 25/48; B64C 25/426; B64C 25/46
See application file for complete search history.

(56) References Cited

U.S. PATENT DOCUMENTS 3,839,818 A * 10/1974 Heggedal ............. A63H 27/007
446/68
5,671,899 A * 9/1997 Nicholas ................... B64C 3/56
244/3.28

(Continued)

*Primary Examiner* — Justin M Benedik
(74) *Attorney, Agent, or Firm* — Renner, Kenner, Greive, Bobak, Taylor & Weber

(57) ABSTRACT

An aircraft brake control system accommodates desired yaw for steering, while substantially eliminating undesired yaw. The system assesses brake command signals from the pilot, signals corresponding to aircraft parameters, and signals based on brake control parameters, and determines therefrom an amount of yaw desired by the pilot. The instantaneous yaw rate is monitored and compared to the desired yaw rate. An error signal corresponding to the difference between instantaneous and actual yaw rates is calculated and that error signal is employed to modify a braking differential between right and left brakes to eliminate or substantially reduce the undesired yaw.

6 Claims, 6 Drawing Sheets

(56) References Cited

U.S. PATENT DOCUMENTS

| | | | | |
|---|---|---|---|---|
| 6,056,237 | A * | 5/2000 | Woodland | F42B 12/365 |
| | | | | 244/49 |
| 6,183,051 | B1 * | 2/2001 | Hill | B60T 8/885 |
| | | | | 303/20 |
| 6,882,920 | B2 * | 4/2005 | Rudd, III | B60T 8/1703 |
| | | | | 701/91 |
| 9,227,608 | B2 * | 1/2016 | Hill | B60T 8/1703 |
| 9,296,468 | B1 * | 3/2016 | Harvey | B64C 39/024 |
| 9,545,991 | B1 * | 1/2017 | Alley | B64C 39/024 |
| 10,259,435 | B2 * | 4/2019 | Georgin | B60T 8/171 |
| 2008/0001471 | A1 * | 1/2008 | Rudd | B60T 8/1764 |
| | | | | 303/3 |
| 2016/0176502 | A1 * | 6/2016 | Snook | B64C 3/546 |
| | | | | 244/218 |

* cited by examiner

YAW REDUCTION SYSTEM AND METHOD FOR AIRCRAFT BRAKING

CROSS-REFERENCE TO RELATED APPLICATION

This application claims priority on co-pending U.S. Provisional Patent Application No. 62/951,500, filed Dec. 20, 2019, entitled "Yaw Reduction System and Method for Aircraft Braking."

TECHNICAL FIELD

The invention herein resides in the art of vehicle braking systems and methodologies. More particularly, the invention relates to aircraft braking systems and methodologies, and even more specifically to such systems and methodologies that are torque-based and that significantly reduce unintended yaw of the aircraft during braking and particularly in a "brake-by-wire" system.

BACKGROUND OF THE INVENTION

Increasing fuel efficiency has long been a goal of the aerospace industry. By reducing the weight of an aircraft, less fuel is consumed and fuel efficiency is necessarily increased. It has been found that even a small reduction in aircraft weight may lead to a substantial fuel savings over extended periods of time.

Aircraft contain many mechanical and hydraulic systems that are heavy and take up substantial space within the aircraft. Accordingly, the aerospace industry constantly seeks to find ways to reduce the size of mechanical and hydraulic components and, indeed, often seeks ways of eliminating them altogether. One way to reduce the aircraft weight and free the airframe of mechanical and hydraulic components is to include lighter-weight components and incorporate more electrical controls in place of the mechanical/hydraulic devices.

In an effort to save weight and reduce cost and fuel consumption, certain aircraft designs may elect to reduce or eliminate ground spoilers. With increased aerodynamic lift and reduced drag from the reduction or elimination of ground spoilers, braking system yaw sensitivity is increased during landing stops, pilot workload is increased, and raking effectiveness decreased. Addition of a means of yaw control can help compensate.

Another area of weight and cost savings is the elimination of thrust reversers on smaller aircraft. Without the drag provided by thrust reversers, there is additional burden placed on the wheel brakes to slow the aircraft, especially at higher speeds. This emphasizes any yaw sensitivity induced by wheel brakes.

Weight could potentially be saved by use of braking materials that offer longer wear life, but poorer controllability. Because of the lower wear rates, the wheel and brake weight could be reduced by reduction in the amount of wear material while still achieving acceptable life. A yaw control system could help tame the undesirable consequences of the reduced controllability such as increased pilot workload.

Another issue with existing aircraft is the event of yawing or veering during brake engagement. If an aircraft veers off the runway, safety is compromised and the consequences can be catastrophic. A braking system with the capability of reducing unintended veering could provide a safety improvement.

DISCLOSURE OF INVENTION

The focus of the invention herein is to reduce unwanted yaw of an aircraft during aircraft landing and braking. By "unwanted yaw," the invention seeks to differentiate between yaw intentionally engaged by the pilot to assist in steering the aircraft on the runway as compared to undesired yaw resulting from one or more of: unintentional differences in braking torque on opposite sides of the aircraft; pilot-induced oscillation; runway contamination; and environmental conditions, such as cross-winds. Such is the main thrust of the invention.

It is known from the past that it is common for the pilot to simply seek the application of brake pressure in such a way as to equalize the braking torque on both sides of the aircraft in order to keep the aircraft from yawing. Prior techniques have employed deceleration feedback and/or the use of the antiskid system itself in order to help manage the braking torque differences from side to side. These known techniques have focused primarily on reducing the magnitude of unequal braking torque on both sides of the aircraft, assuming that by doing so, the yaw would be reduced to tolerable levels.

The invention herein seeks to address the root cause of yaw and to optimize intentional differential braking by the pilot to accommodate steering. The actual yaw behavior is to be determined from a sensor or group of sensors, quite possibly including the IRU, which is located near the center of gravity of the aircraft, or to provide separate sensors contemplated to perform this function, as well.

One challenge for the invention is to determine what the pilot desires. Does the pilot desire differential braking to accommodate steering, or is the yaw unintentional and undesired? At the bottom line, the control algorithm must accommodate the needs of the pilot and achieve safe braking and maneuvering of the aircraft on the ground.

In light of the foregoing, one aspect of the invention is to provide a yaw reduction system and method for aircraft braking that is capable of reducing unwanted yaw during aircraft landing and braking.

A further aspect of the invention is the provision of a yaw reduction system and method for aircraft braking that differentiates between intentional yaw employed for steering and maneuvering of the aircraft and unintentional yaw resulting from differences in braking drag on opposite sides of the aircraft.

Still a further aspect of the invention is the provision of a yaw reduction system and method for aircraft braking that accommodates intentional differential braking for steering the aircraft.

Yet another aspect of the invention is the provision of a yaw reduction system and method for aircraft braking that, in implementation, facilitates the overall weight reduction of the aircraft.

Still a further aspect of the invention is the provision of a yaw reduction system and method for aircraft braking that employs additional electrical controls to better manage the consequences of removal of weight-intensive mechanical and hydraulic components.

Yet a further aspect of the invention is the provision of a yaw reduction system and method for aircraft braking that provides for increased safety and cost efficiency in the operation of the aircraft.

The invention herein contemplates a solution to the problem of reducing unintended aircraft veering on the ground by developing a new yaw control system, which correctively applies wheel braking when commanded. Preferably, an active yaw control system may be employed to augment the braking behavior.

Structures and techniques described herein are applicable to a brake-by-wire braking system and help to reduce aircraft veering using differential braking. The active yaw control system and associated methodology presented herein may be applicable to a variety of aircraft types, from the comparatively simple two-main-wheel aircraft to more complex aircraft wherein differential and selective braking may be employed by incorporating sophisticated feedback mechanisms.

The present invention recognizes the need for yaw reduction in braking aircraft in which the yaw rate and/or related aircraft directional information, aircraft orientation inputs, braking sensor feedback, and pilot inputs can all be employed to distinguish between undesired yaw resulting from unintentional differences in braking torque and the desired yaw engaged by the pilot to achieve on-ground steering. The necessary data is seen as being obtained in one instance from the inertial reference unit (IRU) of the aircraft, or in another by implementation of a novel sensor installation capable of detecting yaw rate and aircraft directional information, or yet another system in which the required data is provided as designated input values from the airframe manufacturer.

It will be appreciated that the pilot's directional intentions can be concluded based on steering inputs (rudder pedal and nose wheel steering commands). These can be obtained directly from relevant command or feedback sensors or via digital data obtained from databusses. It will be further appreciated that differential pedal braking can also be a commanded input from the pilot signifying a desire to affect the yaw of the aircraft.

On numerous aircraft, automatic braking systems are often utilized during landing stops and in the event that a take-off must be aborted. These automatic braking systems attempt to apply uniform braking or apply maximum braking as limited by skid control capability of the system. It will be understood that, since the pilot is not manually controlling braking in a differential manner as with pedals, the yaw will need to be addressed by the pilot using other means. It will also be appreciated that yaw control would lessen pilot workload by correcting yaw that may result from non-uniform braking torque across the aircraft.

The yaw control will also be compatible with vibration control functions built into the brake control system. With respect to dual cavity brakes, this means allowing activation of only a single cavity during a braking event, while retaining yaw control. For four wheel dual system architecture, this means activation of only a single system. This allows the system to reduce vibration to improve braking feel through the use of a single cavity for lower energy braking stops and taxi snubs while retaining the capability to utilize both cavities for higher energy braking events where the additional torque produced by the second cavity is required.

Existing brake control system design already allows for the system to operate with only a single system to accommodate failure conditions or to allow an intentional use of only a single system for brake wear purposes. The yaw control functionality has been built to adjust this existing control output by accounting for commanded yaw versus actual yaw and adjusting accordingly. This ensures that when only single system operation is available (or only a single cavity on a brake is available) that yaw control remains operational and still optimizes braking action based on desired yaw.

With respect to electric braking systems, the inherent design of the brake control system already utilizes individual commands to the electric motor actuators in the brake to achieve a given braking command. Yaw control has been designed to integrate with this existing architecture allowing selective commands to the motors of each brake, allowing for adjustment to account for equipment failure or to reduce brake wear, while retaining fully yaw authority during braking action.

In the case of equipment failure, an inboard vs. outboard four wheel architecture typically requires the associated system to be fully inactivated in case of a failure of a single brake in the system. For example, if one of the inboard brakes becomes unavailable, only outboard braking is then available for use as otherwise an unintended yaw action can be produced due to the uneven braking. However, with yaw control, the still operating brake in that system can still be used as yaw control will compensate for this unintended yaw action allowing for improved braking performance under these failure conditions.

Similarly, for an electrical braking system, in the case of one or more failed motor actuators on a given brake, the yaw control function will compensate for any unintended yaw produced as a result of differences in braking action for brakes on opposite sides of the aircraft. This will help improve braking feel while also maintaining optimal stopping performance by utilizing non-failed equipment.

Several aspects of yaw control are applicable to aircraft which have more than one braked wheel on each side of the aircraft. Typically, applying a left brake pedal will operate all brakes on the left side of the aircraft and applying right brake pedal will operate all brakes on the right side. With this invention, in the interests of optimizing the gain characteristics of the system, it would not be necessary to apply all of the brakes on one side to a uniform level. Such an approach could be utilized for reasons of system gain, brake temperature moderation, and wear. It is clear that resulting drag force asymmetry from selective braking could be exploited.

It will be understood by those skilled in the art that electro-mechanical brakes can often be more precisely controlled than their hydraulic equivalents. This precision can allow selective use of actuators and their individual positioning to enhance the control effects described previously.

The foregoing and other aspects of the invention that will become apparent as the detailed description proceeds are achieved by an aircraft brake control system, comprising: left and right pilot-controlled brake pedals emitting first output signals corresponding to pilot-requested brake activity; a first data source providing second output signals corresponding to aircraft parameters; a second data source providing third output signals corresponding to brake control parameters; a processing unit receiving said first, second and third output signals and determining therefrom an amount of yaw desired by the pilot and providing to left and right summers fourth output signals corresponding to said desired amount of yaw; and a source of data presenting an instantaneous yaw rate output signal to said left and right summers, said summers providing brake control signals adjusted to compensate for the actual yaw rate of the aircraft.

Other aspects of the invention that will become apparent herein are achieved by a method for controlling yaw during aircraft braking, comprising: generating left and right brake command signals from a pilot's demand; generating first signals based on aircraft parameters; generating second signals based on brake control parameters; processing said left and right brake command signals with said first and second signals and determining therefrom an amount of yaw desired by the pilot; monitoring an instantaneous yaw rate; generating an error signal as a difference between said instantaneous yaw rate and said amount of yaw desired by the pilot; and using said error signal to modify aircraft braking.

The yaw control will also be compatible with vibration control functions built into the brake control system. With respect to dual cavity brakes, this means allowing activation of only a single cavity during a braking event while retaining yaw control. For four wheel dual system architecture, this means activation of only a single system. This allows the system to reduce vibration and to improve braking feel through the use of a single cavity for lower energy braking stops and taxi snubs while retaining the capability to utilize both cavities for higher energy braking events where the additional torque produced by the second cavity is required.

Existing brake control system design already allows for the system to operate with only a single system to accommodate failure conditions or to allow an intentional use of only a single system for brake wear purposes. The yaw control functionality has been built to adjust this existing control output by accounting for commanded yaw versus actual yaw and adjusting accordingly. This ensures that when only single system operation is available (or only a single cavity on a brake is available) that yaw control remains operational and still optimizes braking action based on desired yaws.

With respect to electric braking systems, the inherent design of the brake control system already utilizes individual commands to the electric motor actuators in the brake to achieve a given braking command. Yaw control has been designed to integrate with this existing architecture allowing selective commands to the motors of each brake, allowing for adjustment to account for equipment failure or to reduce brake wear, while retaining full yaw authority during braking action.

In the case of equipment failure, an inboard vs. outboard four wheel architecture typically requires the associated system to be fully inactivated in case of a failure of a single brake in the system. For example, if one of the inboard brakes becomes unavailable, only outboard braking is then available for use as otherwise an unintended yaw action can be produced due to the uneven braking. However, with yaw control, the still operating brake in that system can still be used as yaw control will compensate for this unintended yaw action allowing for improved braking performance under these failure conditions.

Similarly for an electrical braking system, in the case of one or more failed motor actuators on a given brake, the yaw control function will compensate for any unintended yaw produced as a result of differences in braking action for brakes on opposite sides of the aircraft. This will help improve braking feel while also maintaining optimal stopping performance by utilizing non-failed equipment.

BRIEF DESCRIPTION OF THE DRAWINGS

For a complete understanding of the various aspects of the invention, reference should be made to the following detailed description and accompanying drawings, wherein.

DETAILED DESCRIPTION OF PREFERRED EMBODIMENT

Figure 1:
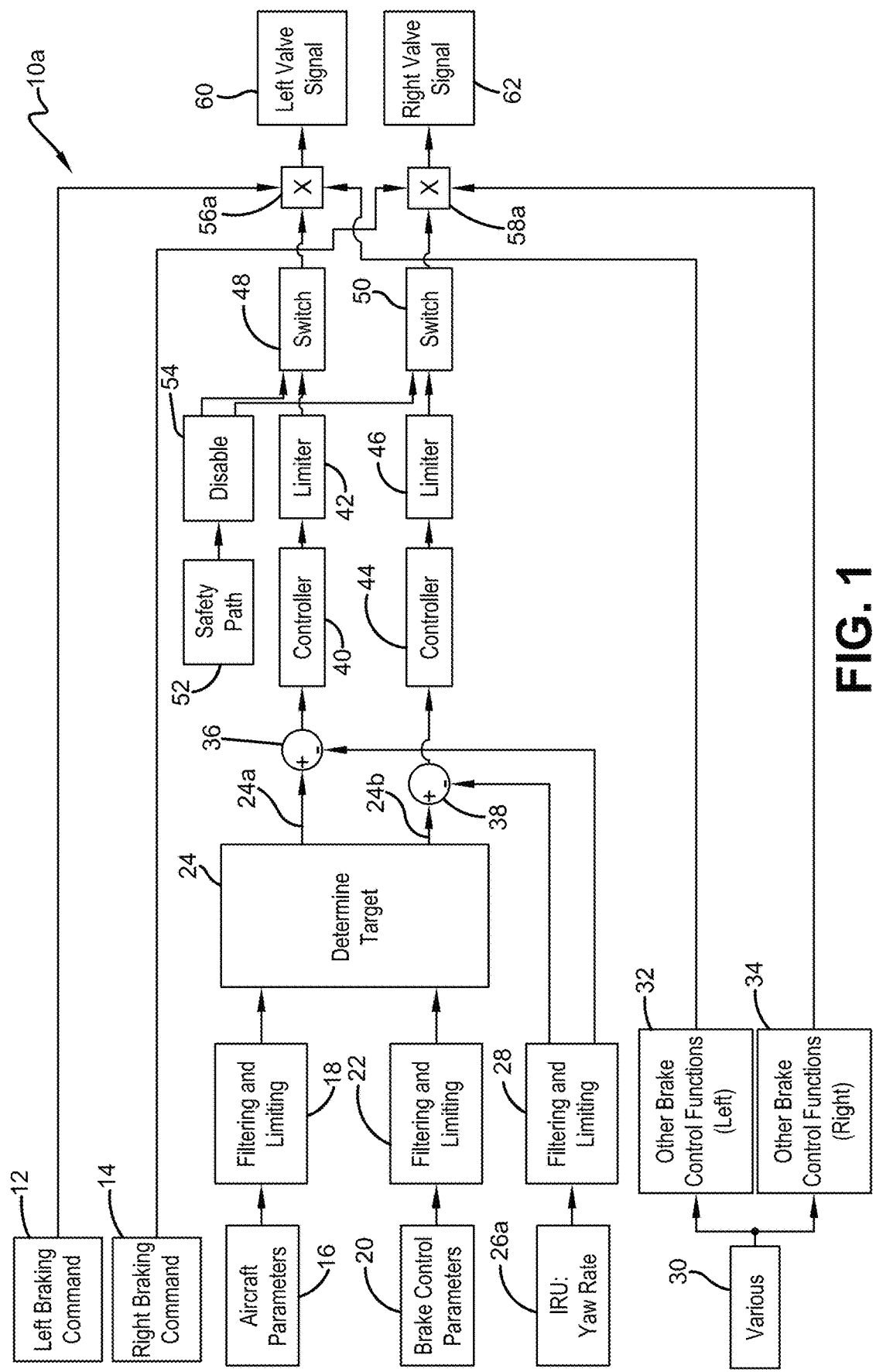
FIG. 1 is a flow diagram of a first embodiment of the invention obtaining yaw rate information from the inertial reference unit of the aircraft.
Figure 2:
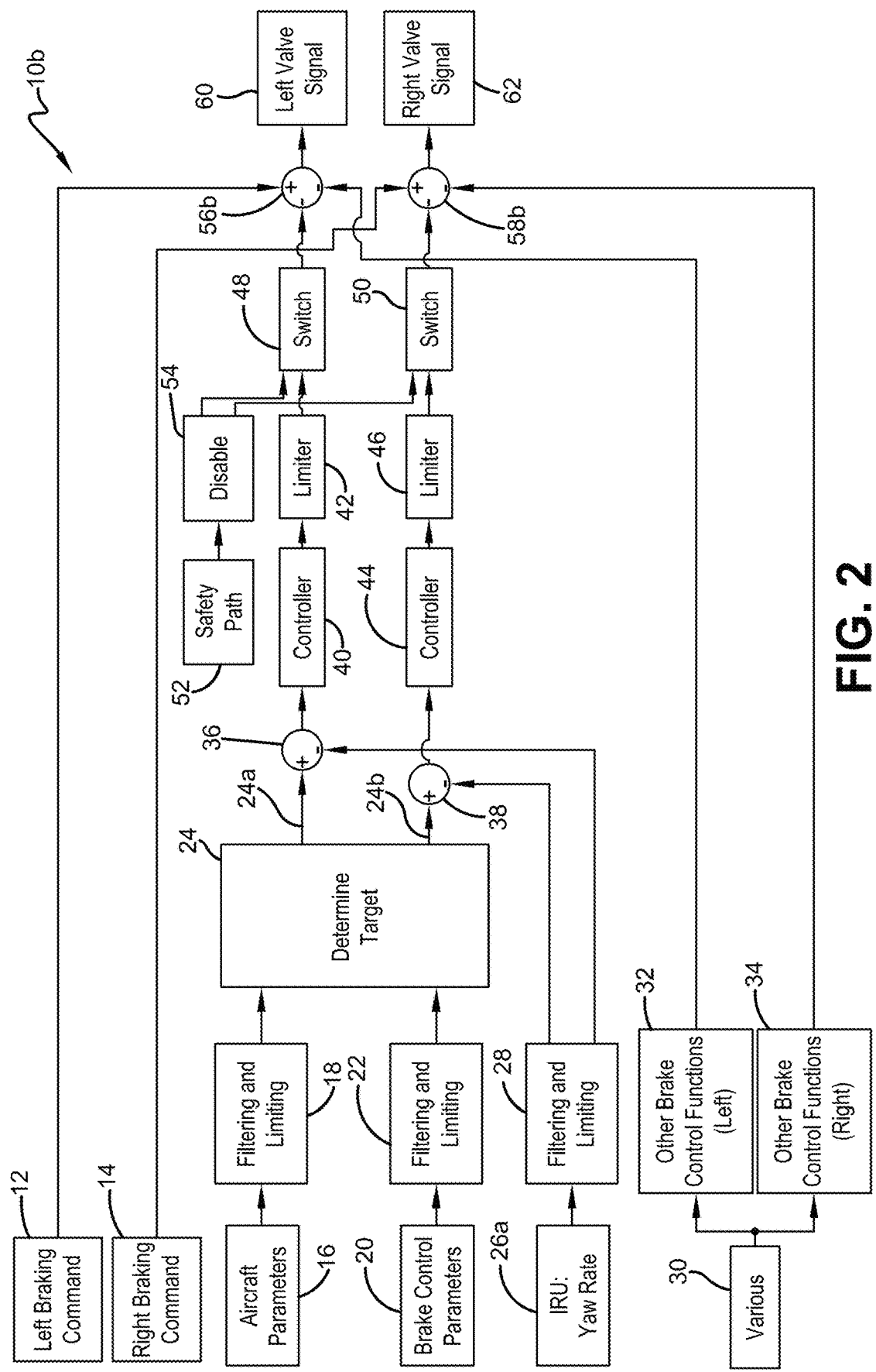
FIG. 2 is a flow diagram of the system of FIG. 1, showing the summation of the control signals to the brake valve.

Referring now to the drawings, and more particularly FIGS. 1 and 2, it can be seen that the structure and process of the invention is shown in system diagrams designated generally by the numerals 10a and 10b, respectively. The systems 10a and 10b closely correlate with each other, and corresponding elements and features are identified by the same reference numeral throughout.

In rather standard fashion, left and right braking command signals 12, 14 are provided by pilot actuation of the brake pedal using a linear variable differential transformer or the like to correlate brake pedal depression with a requested brake torque. Signals corresponding with aircraft parameters, such as aircraft weight, heading, acceleration/deceleration, weight-on-wheels, and the like are generated as at 16 and passed through filtering and limiting circuitry 18 for use within the system.

Signals corresponding with brake control parameters, such as wheel speed, brake pressure, brake torque, antiskid operations, autobrake commands, and the like are generated at 20 and passed through filtering and limiting circuitry 22 for use within the system.

A processing unit 24 receives the left and right braking command signals 12, 14, aircraft parameter signals 16, and brake control parameter signals 20, all filtered, scaled, and limited. The processing unit 24 assesses the desired braking request of the pilot by assessing the signals from 12, 14, 16 and 20, and determines a braking target. In effect, the assessment at 24 is to determine the braking operation intended by the pilot and determine, for example, whether the pilot desires to effect yaw to control ground steering of the aircraft, or if any yaw experienced by the aircraft is not desired.

Left and right modified brake control signals are provided by the processing unit 24 at respective outputs 24a, 24b.

The inertial reference unit 26a of the aircraft provides an output signal corresponding to yaw rate, which is filtered, scaled, and limited at 28. The filtered, scaled, and limited yaw rate signal is passed to summing circuits 36, 38, at the negative inputs. The positive inputs respectively receive the left and right yaw control signals 24a, 24b of the processing unit 24. The outputs of the summing circuits 36, 38 are thus further modified brake control signals, adjusted to compensate for the actual yaw rate being experienced by the aircraft. These further modified brake control signals are passed through a left controller and limiter 40, 42 and a right controller and limiter 44, 46 as yaw-modified brake control signals. Switches 48, 50 are provided to allow a selection as to whether the yaw control signals may reach the left and right brake valves to augment the braking operation.

The switches 48, 50 are provided to interconnect a safety path 52, which can serve to disable or block the application of the yaw control signals by actuation of a disable signal generator 54, closing the switches 48, 50. Such disablement overrides or effectively eliminates the yaw control process in particular situations, such as, for example, an inadequate system operational status or the presence of heavy crosswinds on the runway during landing.

With the switches 48, 50 in their normally open position, the yaw control signals 24a, 24b, as modified at the summing circuits 36, 38 and passed through the controllers and limiters 40, 42 and 44, 46, and associated switches 48, 50, are passed to a brake control signal generator 56a, 58a. There, the outputs of switches 48, 50 are employed to augment the left and right brake control signals 12, 14 before application to respective brake valves 60, 62. Similarly, signals correlated with various other aircraft parameters 30 may provide other brake control functions to the left and right portions of the brake control system as at 32, 34. From there, appropriate signals affecting brake actuation are generated and passed to the brake control signal generators 56a, 58a. Such signals 32, 34 can be of any of various types, including but not limited to antiskid control signals.

It will be appreciated that the brake control signal generators 56a, 58a receive for the respective left and right braking operations, the braking command signal from the pilot, a yaw adjustment signal when the switches 48, 50 are in their normally closed positions, and signals corresponding to other brake control functions, such as antiskid and the like. These signals may be weighted, combined, or otherwise utilized to generate an ultimate brake control signal to the respective left and right brake valves 60, 62.

It will be appreciated with respect to FIG. 2 that the system 10b correlates with the system 10a, but in which the brake control signal generators 56a and 58a are shown as summing circuits 56b, 58b, with positive inputs of pilot-demanded brake torque reduced at the negative inputs by signals corresponding to other brake control functions and yaw-limiting circuitry.

Figure 3:
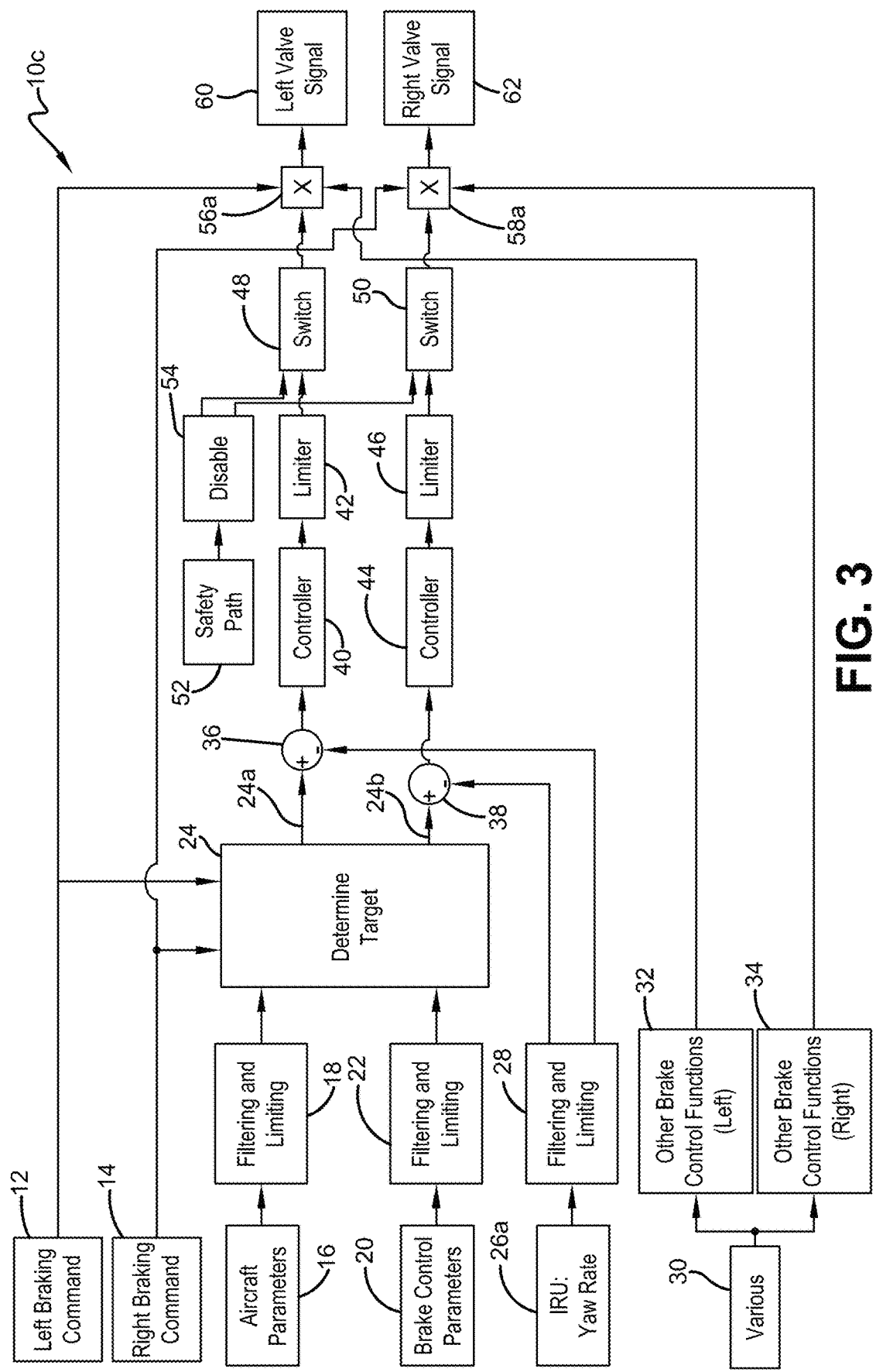
FIG. 3 is a flow block diagram of a second embodiment of the invention employing a separate yaw rate sensor.
Figure 4:
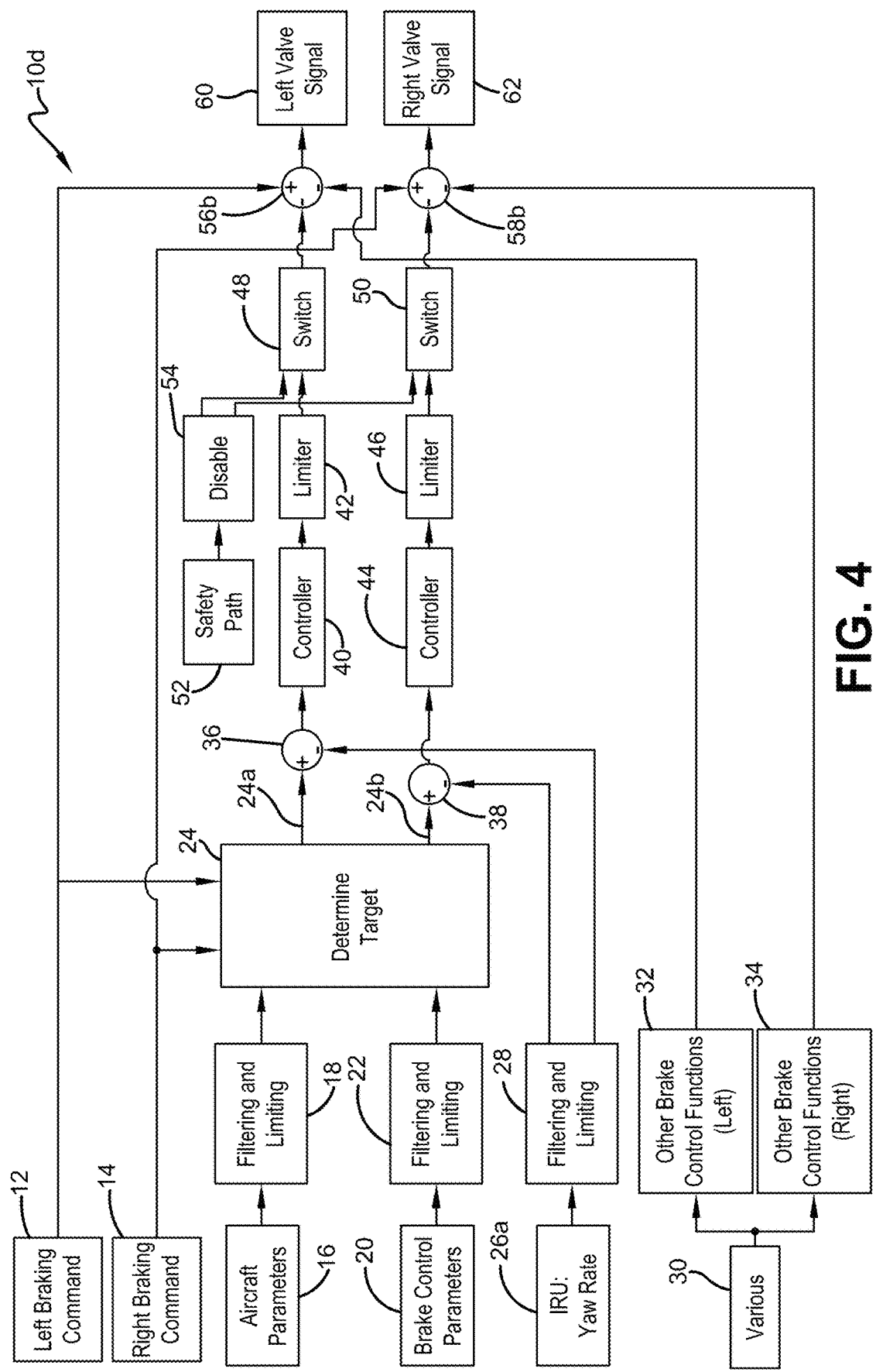
FIG. 4 is a flow diagram of the embodiment of FIG. 3 showing the summation of the control signals for application to the brake valve.

With reference now to FIGS. 3 and 4, it can be seen that modifications of the systems 10a, 10b of FIGS. 1 and 2 are presented and designated respectively as systems 10c and 10d. It will be particularly appreciated that system 10c correlates with system 10a, and system 10d correlates with system 10b by the substitution of a yaw rate sensor 26b in systems 10c and 10d for the inertial reference unit yaw rate computation of systems 10a and 10b.

Although FIGS. 1-4 describe outputs to control a hydraulic valve supplying pressure to a brake or brakes, the invention also contemplates the application to electromechanically actuated brakes wherein electromechanical actuators replace valves and pistons. The precise control capabilities of electromechanical actuators as well as their typical multiplicity on each brake offer additional control options with selective braking.

The invention contemplates that a multitude of data is available in association with most aircraft, and that such data may be employed to assess yaw activity, braking activity, and the like to generate the appropriate braking signal for an aircraft. Among the available data, including that already discussed, is data corresponding to ground speed, wheel speed, left/right brake pedal command, aircraft heading, yaw angle, yaw rate, roll angle, roll rate, yaw rate/long speed/roll rate vector, lateral acceleration, longitudinal acceleration, rudder command, nose wheel steering command, brake pressures, auto brake commands, tire slip, aircraft weight, and aircraft model. From various combinations of this data, effective brake control signals, taking into account yaw, and differentiating undesired yaw from yaw intended for steering control, can be generated and employed.

In the embodiments shown, the processing unit 24 can differentiate between intentional and unintentional yaw from inputs of: the pilot's use of input controls (which include but are not limited to the requested braking activity of left and right brake assemblies, and rudder deflection); aircraft dynamics; and aircraft model parameters. This processing unit can determine, for example, whether a differential of requested braking activity between the right and left brake assemblies is of such a nature as to be intended for steering purposes, or if it is an anomaly, requiring correction. Within 24, conversion profiles, particular to each aircraft platform, convert the pilot's use of input controls into inferred desired yaw rates, implicitly considering the aircraft's reference speed, amongst other factors, in the process of doing so. The desired yaw rates inferred from the pilot's use of each individual input control are combined to infer the pilot's overall desired yaw rate for the aircraft. By way of example only, the magnitude of differential brake pedal actuation, assessed in light of the aircraft speed, may suggest that the yaw is intended for steering (particularly at low speeds), or that it is a hazardous anomaly when experienced at high speeds. Those skilled in the art will readily appreciate the various parameters to be assessed to accommodate necessary and desired differential braking while still minimizing undesired yaw. The functionality to differentiate between intentional and unintentional yaw provides the means for the invention to assist the pilot in the lateral control of the aircraft via its braking system. In addition to the differentiation between intentional and unintentional yaw, the invention further cooperates with the pilot by adapting the aggressiveness of its behavior in response to the pilot's use of aircraft controls. This receptiveness and adaptation provides a system that is capable of assisting the pilot's lateral control of the aircraft during a range of landing and ground operations scenarios.

Figure 5:
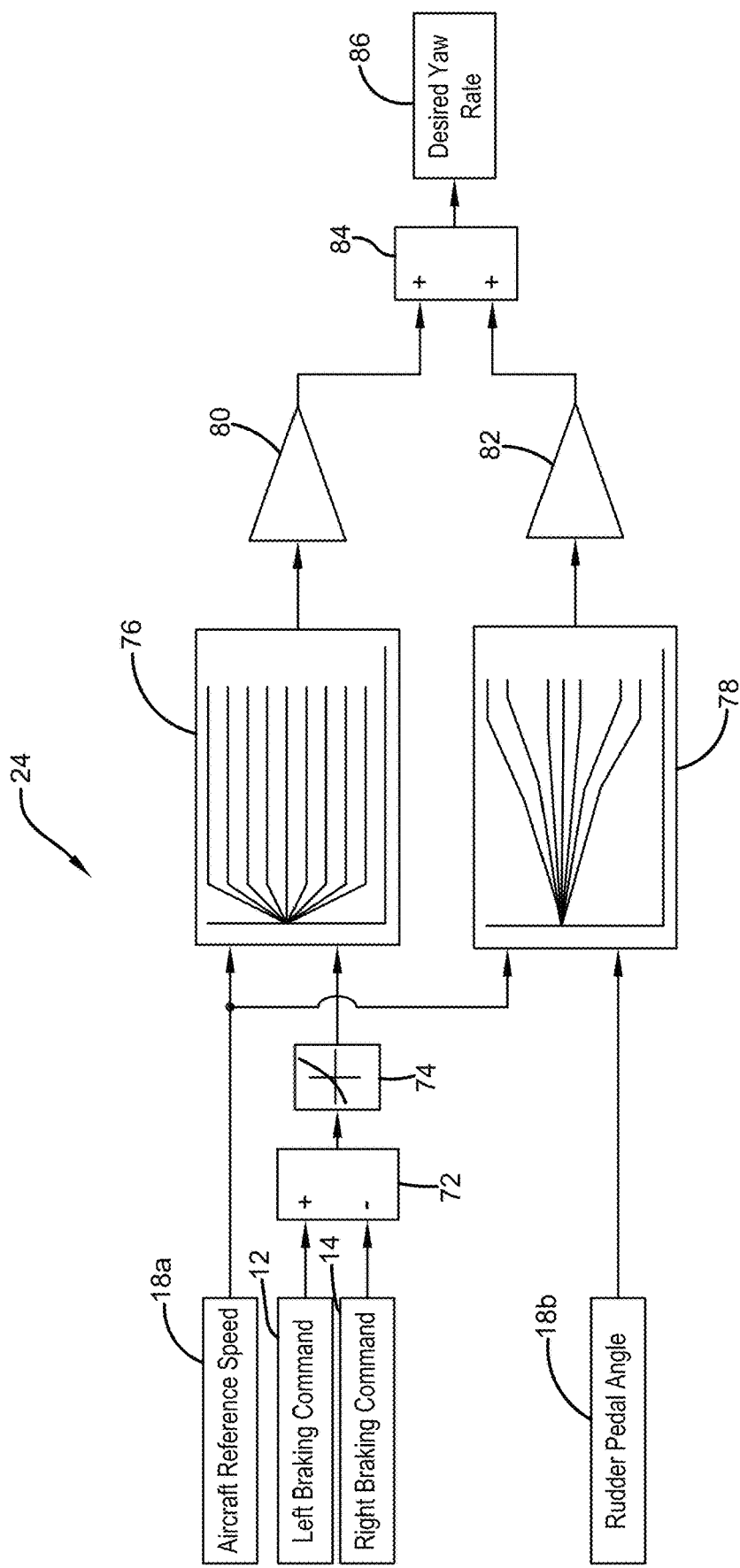
FIG. 5 is a flow diagram depicting a means of determining pilot intent.

Turning to FIG. 5, a preferred embodiment of determination of the pilot's desired yaw rate intent is contained in processing unit 24. The processing unit 24 acquires a variety of signals such as aircraft reference speed 18a, left and right brake braking commands 12 and 14, respectively. Block 72 finds the difference in left and right brake pedal commands 12 and 14 and block 74 applies a mapping of this difference to achieve a modified output. Aircraft reference speed 18a, the output of block 74, and rudder pedal angle 18b are inputs to multi-dimensional look-up tables 76 and 78 which apply a transformation to the signals. Outputs from the look-up tables 76 and 78 have gains 80 and 82, respectively, applied and the outputs are combined in summing block 84. The resulting output of block 84 is the desired yaw rate 86.

It will be appreciated by those skilled in the art that FIG. 5 does not depict the full complement of aircraft parameters which would be included using similar processing of the data such as nose wheel steering inputs, throttle inputs, etc.

Figure 6:
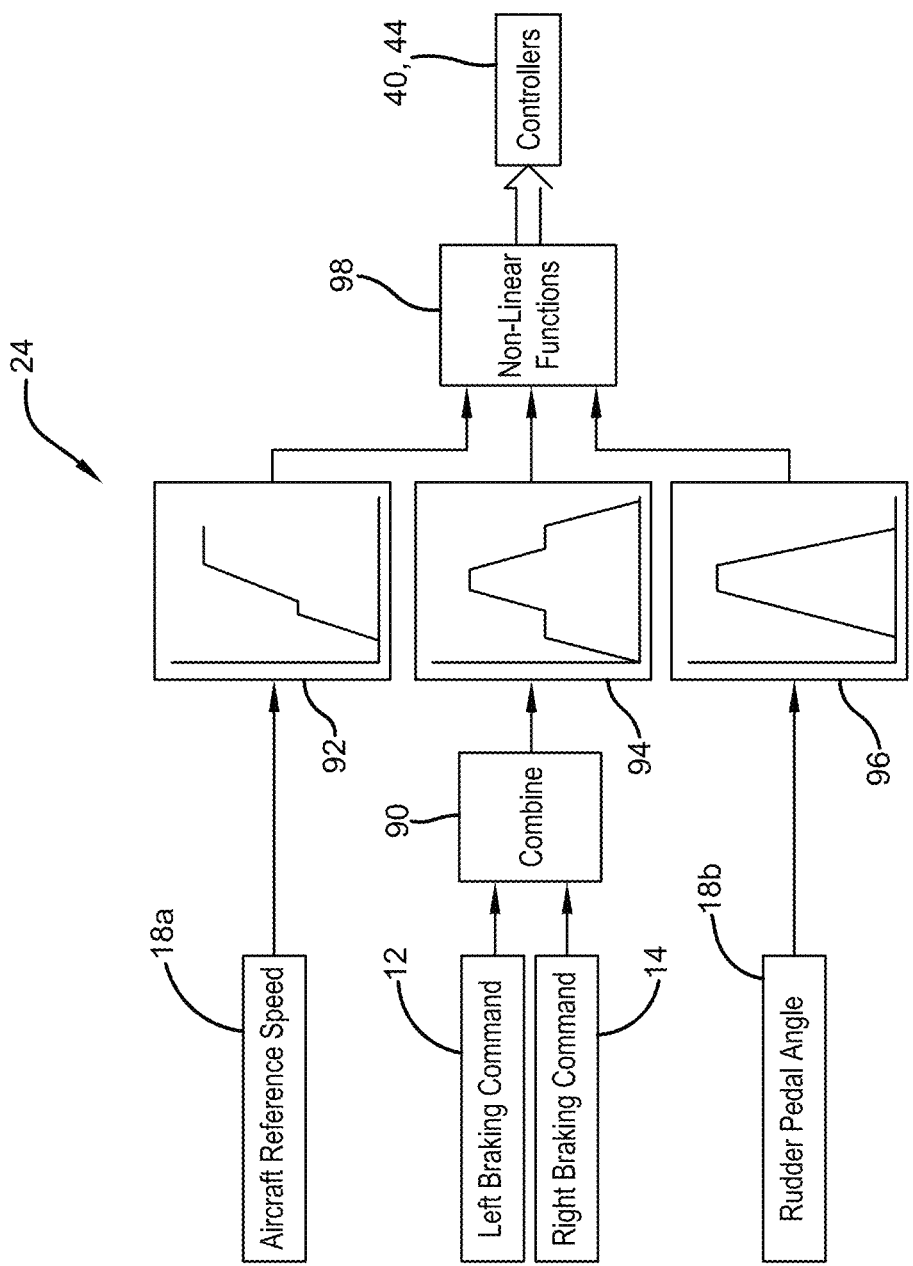
FIG. 6 is a flow diagram depicting enhancement to improve controller adaptability to varying pilot inputs.

FIG. 6 depicts additional processing of incoming signals contained in processing unit 24, which provides adjustment to controller parameters for control units 40 and 44 in order to enhance controller adaptability to varying pilot inputs. The processing unit 24 acquires a variety of signals such as aircraft reference speed 18a, left and right brake braking commands 12 and 14, respectively. Block 90 combines left and right brake pedal commands 12 and 14, and block 94 applies a look-up table to achieve a modified output. Similarly, aircraft reference speed 18a and rudder pedal angle 18b are inputs to look-up tables 92 and 96, which apply transformations to the signals. Outputs from the look-up tables 92, 94 and 96 are further manipulated by various functions 98 and the outputs are provided to controllers 40 and 44 to modify its action.

It will be appreciated by those skilled in the art that FIG. 6 does not depict the full complement of aircraft parameters which would be included using similar processing of the data such as nose wheel steering inputs, throttle inputs, etc.

Although FIGS. 1-4 describe outputs to control a hydraulic valve supplying pressure to a brake or brakes, the invention also contemplates the application to electromechanically actuated brakes wherein electromechanical actuators replace valves and pistons. The precise control capabilities of electromechanical actuators as well as their typical multiplicity on each brake offer additional control options with selective braking.

It will be appreciated that availability of suitable brake torque feedback signals among the brake parameters can be used within the control system to control brake torque and thereby improve the precision with which the pilot may selectively apply torque in a uniform or differential manner. It will be further appreciated that additional assistance to the pilot in achieving precise yaw control can be accomplished through application of techniques embodied therein.

Thus it can be seen that the various aspects of the invention have been achieved by the system presented and described above. While in accordance with the patent statutes only the best mode and preferred embodiment of the invention has been presented and described in detail, the invention is not limited thereto or thereby. Accordingly, for an appreciation of the scope and breadth of the invention reference should be made to the following claims.

What is claimed is:

1. An aircraft brake control system, comprising:
    left and right pilot-controlled brake pedals emitting first output signals corresponding to pilot-requested brake activity;
    a first data source providing second output signals corresponding to aircraft parameters;
    a second data source providing third output signals corresponding to brake control parameters;
    a processing unit receiving said first, second and third output signals and determining therefrom an amount of yaw desired by the pilot and providing to left and right summers fourth output signals corresponding to said desired amount of yaw;
    a source of data presenting an instantaneous yaw rate output signal to said left and right summers, said summers providing brake control signals adjusted to compensate for an actual yaw rate of the aircraft
    left and right control signal generators connected to left and right controllers and limiters, said left and right controllers and limiters receiving said brake control signals;
    said left and right control signal generators being further connected to and receiving signals from said left and right pilot-controlled brake pedals, along with other signals associated with particular brake operations, and being further connected to and providing output brake control signals to associated brakes; and
    further comprising a safety path, disable signal generator and switches, interconnected with said left and right control signal generators.

2. The aircraft brake control system according to claim 1, wherein said other signals from associated particular brake operations comprise anti-skid signals for anti-skid systems.

3. The aircraft brake control system according to claim wherein closure of the switches presents the yaw control process in particular situations comprising heavy crosswinds of a runway during braking or inadequate system operational status.

4. The aircraft brake control system according to claim 3, where in normal operation of the open switches, full operation of the brake system is engaged and modified by yaw influence.

5. A method for controlling yaw during aircraft braking, comprising:
    generating left and right brake command signals from a pilot's demand;
    generating first signals based on aircraft parameters;
    generating second signals based on brake control parameters;
    processing said left and right brake command signals with said first and second signals and determining therefrom an amount of yaw desired by the pilot;
    monitoring an instantaneous yaw rate;
    generating an error signal as a difference between said instantaneous yaw rate and said amount of yaw desired by the pilot;
    using said error signal to modify aircraft braking; and
    further comprising the step of using only a single cavity of dual-cavity brakes to augment brake application to control yaw.

6. The method for controlling yaw during aircraft braking according to claim 5, further comprising the ability to selectively engage and disengage yaw considerations in the braking effort and a determination whether to engage such yaw considerations.

\* \* \* \* \*